(12) United States Patent
Ball, IV

(10) Patent No.: US 9,199,251 B1
(45) Date of Patent: Dec. 1, 2015

(54) DESANDING, FLOW SPLITTING, DEGASSING VESSEL

(71) Applicant: KBK Industries, LLC, Rush Center, KS (US)

(72) Inventor: Will D. Ball, IV, Bixby, OK (US)

(73) Assignee: KBK INDUSTRIES, LLC, Rush Center, KS (US)

( * ) Notice: Subject to any disclaimer, the term of this patent is extended or adjusted under 35 U.S.C. 154(b) by 107 days.

(21) Appl. No.: 14/090,477

(22) Filed: Nov. 26, 2013

(51) Int. Cl.
*B01D 19/00* (2006.01)
*B04C 3/06* (2006.01)

(52) U.S. Cl.
CPC .............. *B04C 3/06* (2013.01); *B01D 19/0057* (2013.01)

(58) Field of Classification Search
CPC ...... B01D 45/16; B01D 19/0057; B04C 3/04; B04C 5/103; B04C 7/00; C02F 1/20; C10G 33/06
USPC .................. 55/345, 392, 393; 210/512.2, 188; 96/182, 183, 208, 209, 211, 212, 216; 95/261, 253
See application file for complete search history.

(56) References Cited

U.S. PATENT DOCUMENTS

| | | | | |
|---|---|---|---|---|
| 554,598 A * | 2/1896 | Gilmore | ............. | B01D 19/0042 208/187 |
| 815,407 A * | 3/1906 | Cooper | .............. | B01D 19/0052 122/379 |
| 1,005,977 A * | 10/1911 | Jones | ..................... | C10G 33/06 208/187 |
| 1,373,664 A * | 4/1921 | Lorraine | ................. | E21B 43/34 96/163 |
| 1,490,462 A * | 4/1924 | Gill | ......................... | E21B 43/34 96/163 |
| 1,512,079 A * | 10/1924 | Bergin | .................... | E21B 43/34 137/179 |
| 1,512,358 A * | 10/1924 | Bertram | ................... | E21B 43/34 96/163 |
| 1,515,126 A * | 11/1924 | Lennox | ................... | E21B 43/34 96/159 |
| 1,535,721 A * | 4/1925 | Gill | ........................ | E21B 43/34 96/163 |
| 1,547,100 A * | 7/1925 | Daughdrill | .............. | E21B 43/34 208/187 |
| 1,625,052 A * | 4/1927 | Ray | ....................... | B01D 19/00 96/183 |
| 1,693,849 A * | 12/1928 | Lorraine | ................. | E21B 43/34 96/183 |
| 1,915,436 A * | 6/1933 | Moore | ............... | B01D 19/0057 96/171 |
| 1,916,065 A * | 6/1933 | Mount | ................... | C10G 33/06 96/183 |
| 2,228,401 A * | 1/1941 | Pressler | ............. | B01D 19/0057 137/202 |
| 2,701,620 A * | 2/1955 | Crawford | ................ | E21B 43/34 137/172 |
| 2,705,053 A * | 3/1955 | Morris | ............... | B01D 19/0057 210/512.1 |
| 2,882,994 A * | 4/1959 | Lovelady | ............... | B01D 45/02 96/183 |
| 2,998,096 A * | 8/1961 | Snipes | .................... | E21B 43/34 96/161 |
| 4,140,344 A | 2/1979 | De Turville | | |
| 4,424,068 A * | 1/1984 | McMillan | ............... | E21B 43/34 95/243 |
| 4,428,839 A * | 1/1984 | Davies | ............... | B01D 19/0057 210/512.3 |
| 4,778,494 A * | 10/1988 | Patterson | ........... | B01D 19/0057 55/416 |
| 4,966,705 A | 10/1990 | Jamieson et al. | | |

(Continued)

*Primary Examiner* — Duane Smith
*Assistant Examiner* — Minh-Chau Pham
(74) *Attorney, Agent, or Firm* — Molly D. McKay

(57) ABSTRACT

An atmospheric vertical oilfield tank designed to pre-condition oilfield fluid streams. Flow enters on tangent a vertical cyclone tube located within the tank and rotates inside the tube. Solids fall downward out of the tube to the bottom of the tank; gases exit upward out of the tube and vent from the tank. Liquids exit the cyclone tube tangential to the ID of the tank, additional solids separation due to impingement, and the liquid flows into the body of the tank where flow slows to allow for settling of solids. Solids are periodically removed from the bottom of the tank. The liquid flows over the top of multiple vertical flow dividing tubes located at the same elevation within the tank, creating separate and equal effluent discharge streams. The tank is taller than destination vessels to provide the height differential necessary to create flow into subsequent tanks without using pumps.

6 Claims, 4 Drawing Sheets

(56) References Cited

U.S. PATENT DOCUMENTS

| | | | |
|---|---|---|---|
| 5,202,026 A * | 4/1993 | Lema | B01D 19/0005 210/787 |
| 5,334,291 A | 8/1994 | Gavlin et al. | |
| 5,827,357 A * | 10/1998 | Farion | E21B 21/063 210/512.2 |
| 6,364,940 B1 * | 4/2002 | Prueter | E21B 43/36 55/345 |
| 6,409,808 B1 * | 6/2002 | Chamberlain | B01D 17/00 210/188 |
| 6,709,500 B1 * | 3/2004 | West | B01D 17/0211 210/512.2 |
| 7,105,044 B2 * | 9/2006 | Konishi | F15B 21/044 210/188 |
| 7,157,007 B2 * | 1/2007 | Frankiewicz | B01D 17/0205 210/703 |
| 7,621,668 B2 | 11/2009 | Littman et al. | |
| 8,012,359 B2 | 9/2011 | Parkinson | |
| 8,075,785 B2 | 12/2011 | Dufrene et al. | |
| 8,333,825 B2 * | 12/2012 | Sarshar | B01D 17/0217 95/243 |
| 8,906,142 B2 * | 12/2014 | Peuker | B01D 17/0217 95/253 |
| 2003/0154860 A1 * | 8/2003 | Milia | B01D 19/0057 95/261 |
| 2005/0011170 A1 * | 1/2005 | Christiansen et al. | 55/345 |
| 2007/0084340 A1 * | 4/2007 | Dou | B01D 19/0057 95/8 |
| 2007/0215541 A1 * | 9/2007 | Kampfer | 210/512.2 |
| 2013/0199137 A1 * | 8/2013 | Hallgren et al. | 55/393 |

* cited by examiner

DESANDING, FLOW SPLITTING, DEGASSING VESSEL

BACKGROUND OF THE INVENTION

1. Field of the Invention

The present invention is an atmospheric vertical oilfield tank specifically designed for oilfield fluid streams entering any production or processing facility, to pre-condition the fluid stream in three ways: 1) to remove solids larger than 120 microns from the liquid stream, 2) to remove associated gases and eliminate their inherent mixing energies from the inlet fluid stream, and 3) to divide the flow hydraulically and evenly into two or more effluent streams.

2. Description of the Related Art

Oilfield production fluid streams contain a variety of components, including sand and silt from fracturing operations, drilling fines, formation fines, water, oil, and gases. It is desirable to first remove the sand and gases from the liquid stream prior to attempting to separate the oil from the water. The separation and removal of sand and other solids and associated gases promotes more efficient oil-water separation in downstream processes, adding to oil volumes and minimizing water pollution. The present invention is designed to initially remove the solids and gases from the liquid components of typical oilfield production fluid streams prior to those streams being further processed by one or more downstream oil-water separation systems.

Also, in addition to removing the solids and gases from the inlet production fluid stream, it is desirable to divide the remaining liquid stream into equal effluent streams without the use of pumps to eliminate their associated mixing/shearing energies and costs. This division of the overall stream generates smaller fluid stream flowing at lowered velocities, thus exponentially promoting downstream separation.

The present invention addresses this need by providing an atmospheric vertical oilfield tank that, after removing the sand and gases from the inlet oilfield production fluid stream, also separates the resulting oil and water effluent into equal streams without the use of pumps. The present invention divides the effluent by employing a plurality of vertical overflow tubes, each of which separates the effluent into equal volume effluent streams. Those equal effluent streams then flow under hydraulic pressure to downstream vessels or units where the effluent streams can more efficiently be treated to separate water from oil and to remove any smaller solids remaining in the effluent stream.

SUMMARY OF THE INVENTION

The present invention is an atmospheric vertical oilfield tank specifically designed to pre-condition oilfield fluid streams entering oilfield production processing facilities. The present invention pre-conditions the stream in three ways.

First, the invention removes solids larger than 120 microns from the liquid streams according to Newton's First Law using centrifugal force followed by Stoke's Law ($V=G_c \cdot x \cdot r^2 \cdot [d_1-d_2]$/viscosity in cP) gravitational settling so solids accumulate in the bottom of the tank.

Second, the invention removes all associated gases, and their inherent mixing energies which complicate separation, from the inlet fluid stream to reduce the Brownian effect on solids, to further promote the separation of the solids, which increases downstream separation efficiencies.

Third, the invention divides the flow hydraulically and evenly, consistent with very low Reynolds Number fluid characteristics (Re=<1) into two or more effluent liquid streams, improving uniformly divided downstream distribution which reduces effluent flow rates, and promote more efficient downstream oil-water separation according to Stoke's Law.

The invention is typically a 10 ft or 12 ft. OD API 12F or 12P vertical tank, with an overall height of from 25 to 40 feet. The diameter of the tank is varied according to the predicted solids loading, with the larger tank holding 40% more solids per foot of height. Also, the height of the tank is varied according to the height of the downstream tanks to allow for gravity flow, thus eliminating the use of pumps and their associated mixing/shearing energies and costs.

The inlet fluid stream flowing into the tank is often a mixture of oil, water, solids, and petroleum gases or air. The inlet fluid enters into the inlet nozzle on the side of the tank just above grade elevation. The inlet nozzle is provided at this elevation on the tank for ease of interconnection to incoming production pipelines. The fluid is then routed internally up inside the tank where it turns horizontal to enter a vertical cyclone tube on tangent to promote centrifugal separation. The fluid enters the vertical cyclone tube in such a manner that the tube imparts a rotating flow to the inlet fluid path inside the tube to separate solids by centrifugal force with a counter-clockwise flow path for those installations that are located above the equator, or alternately, with a clockwise flow path for those installations that are located below the equator.

Solids larger than 120 microns, i.e. nominally the smallest size of fracturing sand currently used in the oil and gas industry, separate from the inlet fluid stream and fall downward out of the upward rotating liquid flow path within the cyclone tube. The solids fall spiraling downward in the area below the inlet fluid stream in the quiescent section of the cyclone tube and settle downward out of the bottom of the tube and onto the bottom of the tank. Solids settling to the bottom of the tank are removed periodically via a series of sand withdrawal connections, or manually through manways provided on the sides of the tank near the bottom of the tank. The inlet and outlet nozzles and piping are sized according to the instantaneous flow rate of the inlet fluid stream.

Just above the inlet to the cyclone tube is a large diameter liquid outlet tube perpendicular to the cyclone tube which allows for the solids-free liquid stream to exit the cyclone tube horizontally and on tangent to both the tube and the inside diameter (ID) of the tank. This fluid stream is directed toward the ID of the tank, allowing the ID of the tank to further enhance solids separation by impingement, and to distribute the liquid stream throughout the liquids phase of the tank to reduce its velocity and thereby further enhance solids separation. Again the solids that are separated from the liquids phase of the fluids fall to the bottom of the tank along with the solids that were separated from the fluids in the cyclone tube. All solids are cyclically removed as required.

Entrained gases and/or air concentrate in the center of the cyclone tube and rise rapidly within the cyclone tube due to the vast density difference between gas/air and water or oil. The gas/air exits at the open top of the cyclone tube which extends into the gas/air phase located above the liquids phase in the top of the tank. Since the instantaneous gas/air volume may be huge due to slugs accumulating upstream or due to simultaneous truck blow down events, gas is allowed to escape from the tank to atmosphere through an oversized pressure-vacuum vent valve mounted on the top of the tank.

The liquid phase in the tank is distributed into the body of the tank to minimize velocities, wave action, and turbulence. The sand free and gas free liquid then flows over the top of one or more vertical flow dividing tubes and exits the vessel as separate and equal volume effluent streams. Generally, from two to four or more vertical flow dividing tubes may be installed within the tank. The open upper end of each vertical flow dividing tube has precisely the same elevation to assure equal spill-over hydraulics, thus assuring the resulting divided effluent streams are essentially equal in volume.

Effluent piping carries the individual divided flow streams to their respective destinations into vessels that are at least 5 ft. shorter in overall height from the tank of the present invention to provide the height differential necessary to accommodate the flow without pumps. The effluent downstream distribution piping is sized so it need not be concentric since the 5+ ft. of head differential between the tank of the present invention and the downstream vessels provides the hydraulic force necessary to prevent flow restriction and to assure uniform overall distribution.

Care must be taken when installing the tank. The tank must be installed perfectly vertical to avoid any leaning of the tank which will affect the spillover elevation and preclude uniform flow division.

Alternately, since the degree of care and attention to details in installation of tanks is not commonplace in the oil industry, it is often necessary to adjust the spillover elevation of the flow dividing tubes after the tank is set in its final location. When this is anticipated, it is necessary to first fill the tank to allow it to settle on its foundation. Using fresh water for this step is advisable since no additional cleaning of the tank will be required in the next step if fresh water is used. Once the tank is filled with fluid and has been allowed to settle (usually overnight), the tank is then drained and entered. If produced water or oil is used to initially fill the vessel, the tank must be cleaned and checked for safe entry prior to entering the tank. Once the tank is safe to enter, the elevations of the spillover tubes are checked with a laser level, and adjusted as necessary to create uniform elevations by trimming the tops of the spillover tubes at the same exact elevation to assure spillover elevation uniformity.

DETAILED DESCRIPTION OF THE PREFERRED EMBODIMENT

Figure 1:
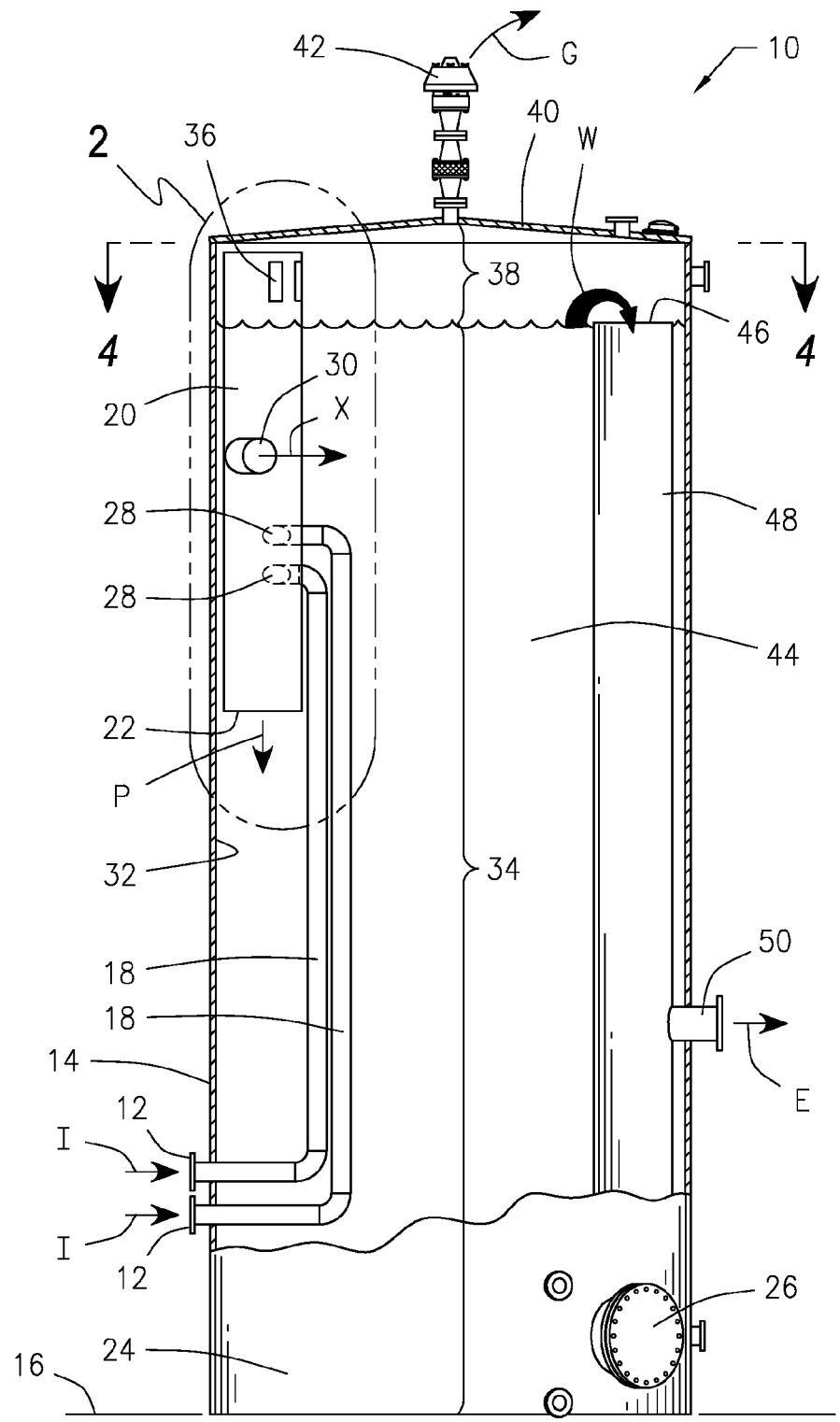
FIG. 1 is a partially cut away view of a desanding, flow splitting, degassing vessel that is constructed in accordance with a preferred embodiment of the present invention.

Referring now to the drawings, and initially to FIG. 1, there is illustrated an atmospheric vertical oilfield tank or vessel 10 specifically designed to pre-condition oilfield fluid streams entering the inlet to production or processing facilities. The tank 10 removes solids from the fluid stream, removes gases from the liquid stream, and hydraulically divides the liquid stream into evenly divided exiting liquid streams.

The tank 10 employed in the invention is typically a 10 ft or 12 ft. outside diameter (OD) API 12F or 12P vertical tank, normally from 25-40 ft. in overall height with non-standard nozzles. The diameter of the tank 10 is varied according to the predicted solids loading, with the larger 12 ft. diameter tank 10 holding 40% more solids per foot of height. Also, the height of the tank 10 is varied according to the height of the downstream tanks to allow for gravity flow, thus eliminating the need for pumps and their associated mixing/shearing energies and costs.

The inlet fluid flowing into the tank 10 is often a mixture of oil, water, solids, and gases/air. The inlet fluid, as shown by Arrows I in FIGS. 1 and 4, enters into the inlet nozzle or nozzles 12 on the side 14 of the tank 10 just above grade elevation 16. The inlet nozzles 12 are provided at this location on the tank 10 to simplify installation and avoid exposure to unsafe working conditions that would be caused by a height of inlets that would requiring a ladder to reach them.

Figure 2:
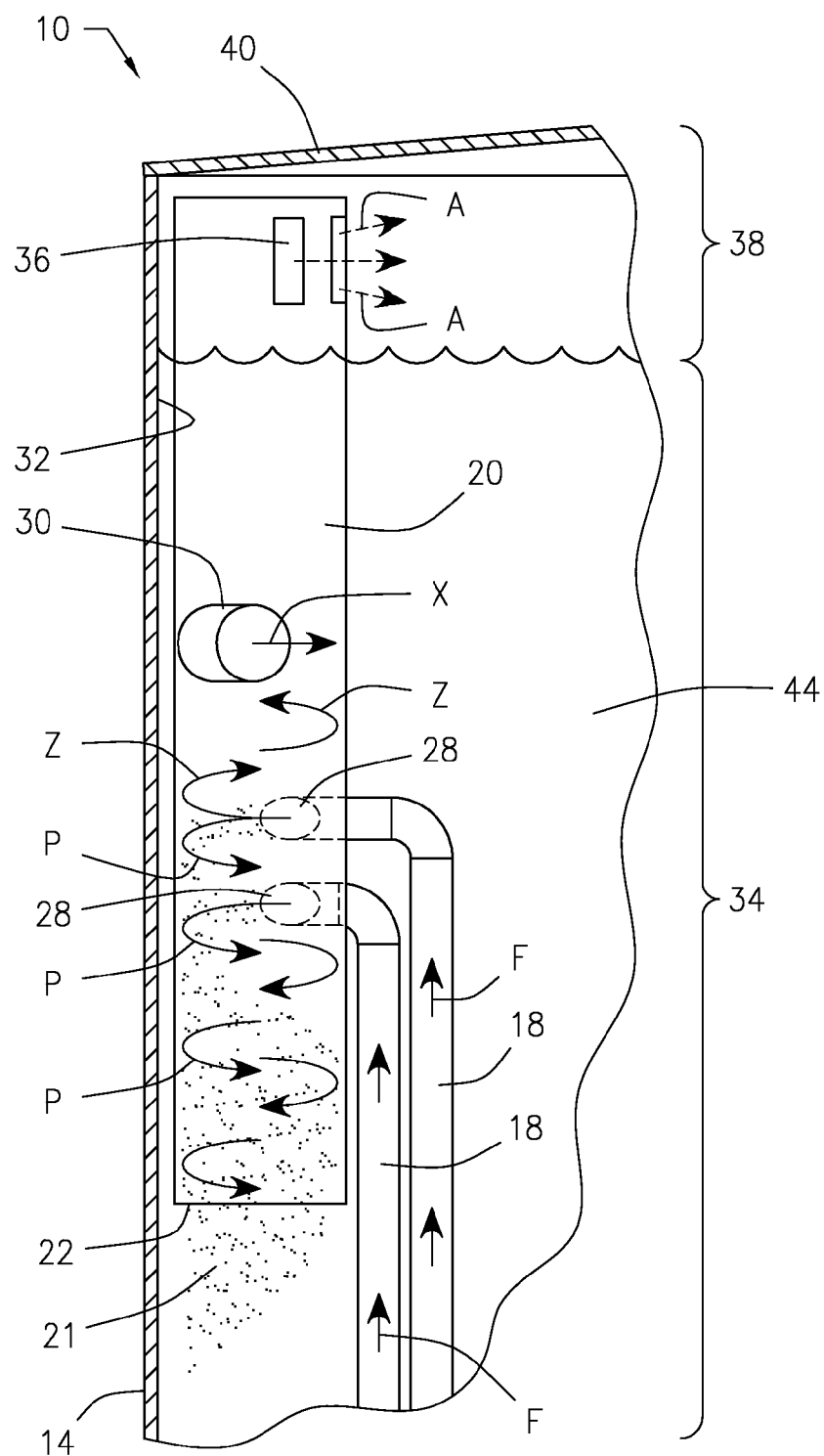
FIG. 2 is an enlarged view of the area of the vessel located within circle 2 of FIG. 1 with arrows showing the paths of the fluid and gas streams as they enter, travel inside, and exit the cyclone tube of the vessel.

Referring also to FIG. 2, the fluid stream is then routed internally up inside the tank through inlet piping 18, as shown by Arrows F, where it turns horizontal to enter a vertical cyclone tube 20 on tangent near the open bottom end 22 of the vertical cyclone tube 20. The mixed fluid stream enters the vertical cyclone tube 20 at one or more cyclone inlets 28 in such a manner that the tube 20 imparts a rotating flow to the inlet fluid path inside the tube 20 to separate solids by centrifugal force. The solids particulates 21, which are shown in FIGS. 1 and 2 in association with Arrows P, spiral downward and fall out of the opening bottom end 22 of the cyclone tube 20 and accumulate in the bottom 24 of the tank 10. The rotating liquid flow is shown by the Arrows Z in FIG. 2 and rotation is in a counter-clockwise flow path to enhance separation for those installations that are located above the equator, and is in a clockwise flow path for those installations that are located below the equator.

Solids larger than 120 microns, i.e. the nominally smallest size of fracturing sand used in the oil and gas industry, separate from the inlet fluid stream and fall downward out of the upward rotating liquid flow path within the vertical cyclone tube 20, settling downward through the open bottom end 22 of the vertical cyclone tube 20 and onto the bottom 24 of the tank 10. Solids settling to the bottom 24 of the tank 10 are removed periodically via a series of nozzles and/or one or more sand cleanout man ways 26 provided at or very near to the bottom 24 of the tank 10. The inlet nozzle 12 and piping 18 are sized according to the instantaneous inlet fluid stream flow rate.

Located in the vertical cyclone tube 20 just above the cyclone inlet or inlets 28 is a large diameter cyclone liquids outlet tube 30 which allows for the partially solids-free liquid stream to exit the vertical cyclone tube horizontally and on tangent. This relationship of the cyclone liquids outlet tube 30 from the vertical cyclone tube 20 is best seen in FIG. 4. The fluid stream discharged from the vertical cyclone tube 20 via the cyclone liquids outlet tube 30 is directed tangentially toward the inside diameter (ID) or inside surface 32 of the tank 10, as show by Arrow X in FIGS. 1 and 2, and by Line X' in FIG. 4. As the liquids flow out tangentially from the outlet tube 30 and impinge on the ID 32 of the tank 10, this impingement further enhances solids separation, and distributes the liquid stream into the liquids phase 34 of the tank 10 in a slowly rotating manner to further enhance solids separation, as indicated by Arrows R in FIG. 3. Again, solids that are separated from the inlet fluids within the liquids phase 34 of the tank 10 fall to the bottom 24 of the tank 10 and are periodically removed along with the solids 21 that were separated from the fluid in the vertical cyclone tube 20.

Figure 3:
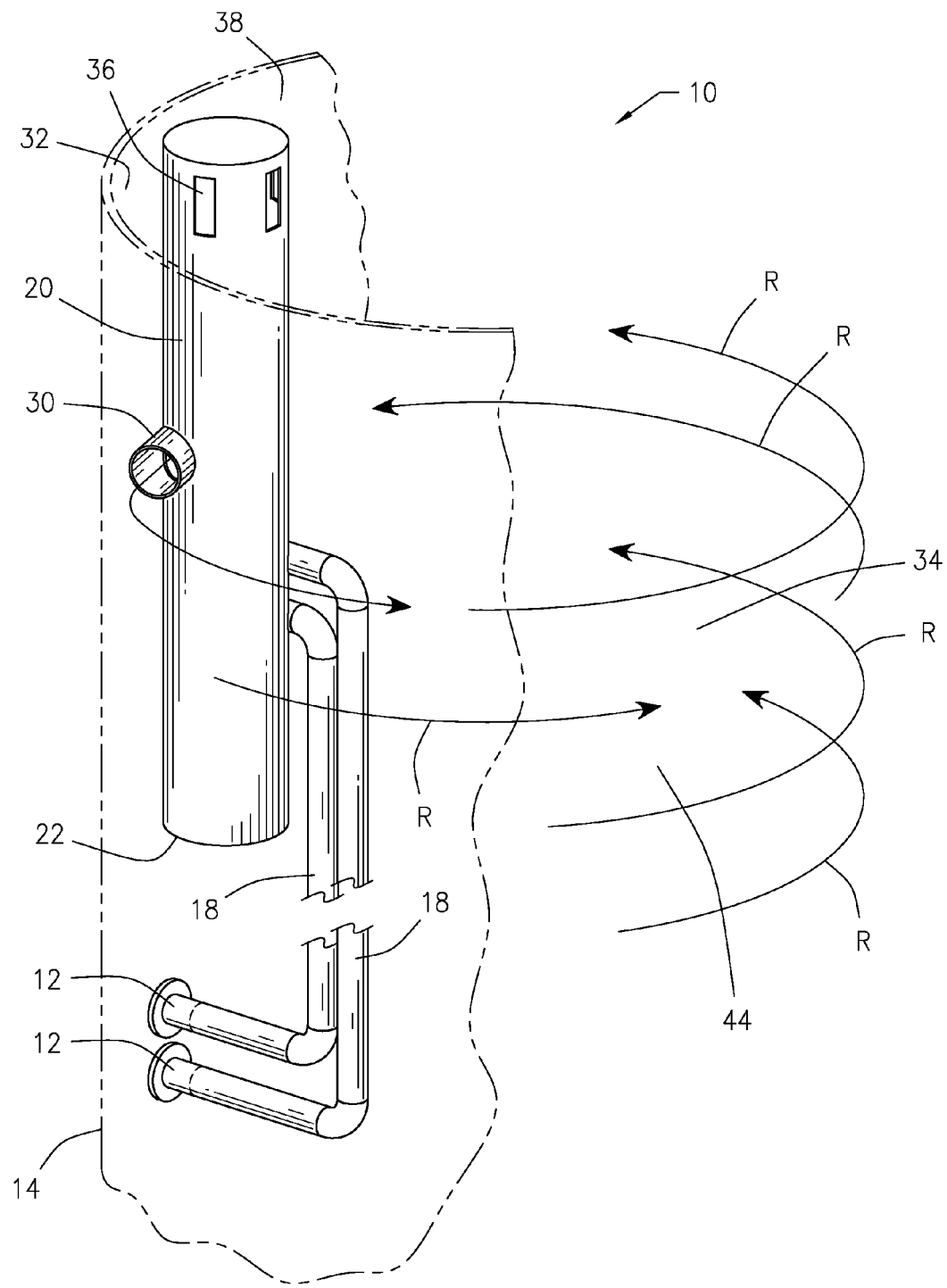
FIG. 3 is a partial perspective view of the vessel of FIG. 1 with arrows showing the flow path of liquid as it exits the cyclone tube and enters the body of the tank. The walls of the tank are shown in outline for clarity.
Figure 4:
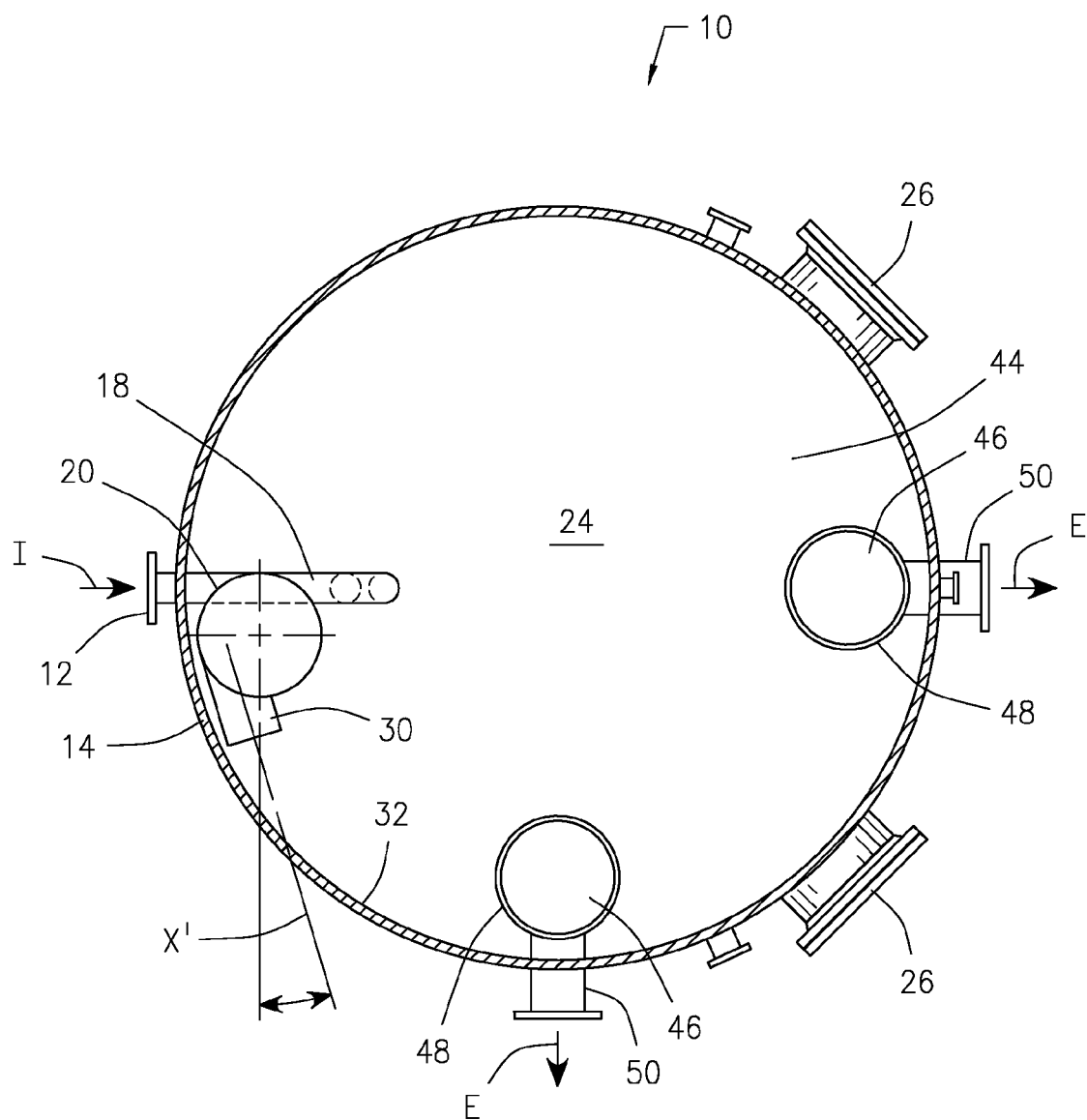
FIG. 4 is a cross sectional view of the vessel taken along line 4-4 of FIG. 1.

Referring to FIGS. 1-3, entrained gases and/or air concentrate in the center of the vertical cyclone tube 20 due to the difference is Reynolds numbers/density, and rise rapidly within the tube 20 to exit at the open top 36 of the tube 20, as shown by Arrows A in FIG. 2. The open top 36 of the tube 20 protrudes into the gas/air phase 38 which is located within the tank 10 at the top 40 of the tank 40 above the liquids phase 34. Since the instantaneous gas/air volume may be huge due to slugs accumulating upstream or due to simultaneous truck blow down events, gas is allowed to escape to atmosphere through a properly sized pressure-vacuum vent valve 42 mounted on the top 40 of the tank 10, as indicated by Arrow G in FIG. 1.

The liquid phase 34 in the tank 10 is distributed into the body 44 of the tank 10 to minimize velocities, wave action, and turbulence. As shown in FIGS. 1 and 4, the almost completely sand free and gas free liquid stream, now quite quiescent, then flows uniformly over the open tops 46 of vertical flow dividing tubes 48, as shown by Arrow W in FIG. 1, and exits the vessel 10 as separate and equal volume effluent streams, as indicated by Arrows E in FIGS. 1 and 4.

Generally, from two to four or more vertical flow dividing tubes 48 may be installed within the tank 10. The open tops or upper ends 46 of each vertical flow dividing tube 48 are located at precisely the same elevation to assure equal spillover hydraulics, thus assuring the resulting divided effluent streams are essentially equal in volume.

Effluent piping 50 carries the individual divided flow streams to their respective destinations into vessels (not illustrated) that are at least 5 ft. shorter in overall height from the tank 10 of the present invention. The effluent or distribution piping 50 is sized so it need not be concentric; the 5 ft. of head differential between the tank 10 of the present invention and the downstream vessels providing the hydraulics necessary to overcome flow restrictions and to assure uniform overall distribution.

Care must be taken when installing the tank 10. The tank 10 must be installed perfectly vertical to avoid any leaning of the tank 10 which will affect the spillover elevation of the vertical flow dividing tubes 48 and thus preclude uniform flow division.

Alternately, since the degree of care and attention to details in installation of tanks is not commonplace in the oil industry, it may be necessary to adjust the spillover elevation of the vertical flow dividing tubes 48 after the tank 10 is set in its final location. When this is anticipated, it is necessary to first fill the tank 10 to allow it to settle on its foundation. Using fresh water for this step is advisable since no additional cleaning of the tank 10 will be required in the next step if produced (salty/oily) water is used. Once the tank 10 is filled with water, and has been allowed to settle (usually overnight), the tank 10 is then drained, checked for safe conditions, and when safe, entered. If produced water or oil were used to fill the vessel 10, the tank 10 must be cleaned and checked for safe entry prior to entering the tank 10. Once the tank 10 is safe to enter, the elevations of the vertical spillover tubes 48 are checked with a laser level, and adjusted as necessary to create uniform elevations by cutting the tops 46 of the spillover tubes 48 at the same exact elevation to assure spillover elevation uniformity.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An atmospheric vertical oilfield tank for preconditioning an oilfield fluid stream entering the inlet to production or processing facilities by desanding, degassing and hydraulically splitting the flow of the liquid into evenly divided exiting fluid streams comprising:
    a vertical liquid fluid receiving tank,
    internal piping communicating between at least one liquid fluid receiving inlet of the tank to at least one cyclone inlet attached to a vertical cyclone tube located within a body of the tank, each said at least one cyclone inlet entering the vertical cyclone tube in such a manner as to cause the entering liquid to impinge on the inside surface of the vertical cyclone tube and to impart rotation to the liquid within the vertical cyclone tube,
    said vertical cyclone tube having a top end that opens into a gas/air phase within the body of the tank, said vertical cyclone tube having an opposite bottom end that opens into a liquids phase within the body of the tank as an exit for separated particles from the vertical cyclone tube into a bottom of the body of the tank,
    a vent provided in a top of the tank that communicates between the gas/air phase within the body of the tank and atmosphere,
    a cyclone liquids outlet tube communicating between the vertical cyclone tube and the liquids phase within the body of the tank, said cyclone liquids outlet tube entering the body of the tank in such a manner as to cause the entering liquid to impinge on the inside surface of the body of the tank and to impart rotation to the liquid within the body of the tank,
    a plurality of vertical flow dividing tubes located within the body of the tank communicating with separate effluent discharge piping designed to carry fluid out of the tank to separate vessels downstream of the tank, and the upper ends of each vertical flow dividing tube being open and at approximately the same elevation within the tank so that liquid flowing from the body of the tank into the open upper ends of the vertical flow dividing tubes is divided into separate liquid flow streams of approximately equal volumes.

2. An atmospheric vertical oilfield tank according to claim 1 further comprising:
    said vertical tank being taller than subsequent downstream vessels to which the effluent discharge piping connects such that flow from the vertical tank occurs without pumps.

3. An atmospheric vertical oilfield tank for preconditioning an oilfield fluid stream entering the inlet to production or processing facilities by desanding, degassing and hydraulically splitting the flow of the liquid into evenly divided exiting fluid streams comprising:
    a vertical liquid fluid receiving tank,
    at least one liquid fluid receiving inlet nozzle provided in said vertical tank, said at least one inlet nozzle in liquid communication via inlet piping with at least one cyclone inlet provided in a vertical cyclone tube located within the tank, said at least one cyclone inlet discharging horizontally and tangentially into said vertical cyclone tube,
    an open bottom end of the cyclone tube communicating with the body of the tank as an exit for separated particles from the vertical cyclone tube into a bottom of the body of the tank,
    an open top of the cyclone tube protruding into and communicating with a gas/air phase located at the top of the tank above a liquids phase, a pressure-vacuum vent valve provided in the top of the tank,
    a cyclone liquids outlet tube provided in the vertical cyclone tube just above the at least one cyclone inlet and said cyclone liquids outlet tube communicating between the interior of the cyclone tube and the liquids phase within the body of the tank, said cyclone liquids outlet tube discharging horizontally and on tangent into the body of the tank to cause the liquids to impinge on the inside wall of the body of the tank and to impart a swirling motion to the liquid as it leaves the vertical cyclone tube, a plurality of vertical flow dividing tubes provided within the body of the tank, each of the vertical flow dividing tubes communicating with associated effluent piping designed to carry the individual divided flow streams to subsequent separate downstream vessels, each of the vertical flow dividing tubes being open at their upper ends, and the upper ends of all of the vertical flow dividing tube being at approximately the same elevation so that liquid flowing from the body of the tank into the open upper ends of the vertical flow dividing tubes is divided into separate liquid flow streams of approximately equal volumes.

4. An atmospheric vertical oilfield tank according to claim 3 further comprising:

said vertical tank being taller than subsequent downstream vessels to which the effluent discharge piping connects such that flow from the vertical tank occurs without pumps.

5. An atmospheric vertical oilfield tank for preconditioning an oilfield fluid stream entering the inlet to production or processing facilities by desanding, degassing and hydraulically splitting the flow of the liquid into evenly divided exiting fluid streams comprising:

a vertical liquid fluid receiving tank, at least one liquid fluid receiving inlet nozzle provided in said vertical tank, said at least one inlet nozzle in liquid communication via inlet piping with at least one cyclone inlet provided in a vertical cyclone tube, said vertical cyclone tube located within the tank such that a fluid stream entering via the at least one inlet nozzle travels through the inlet piping and is discharge horizontally and tangentially through the at least one cyclone inlet into the vertical cyclone to create a rotating flow of the fluid stream within the cyclone tube that impinges on the wall of the cyclone tube, an open bottom end of the cyclone tube communicating with the body of the tank as an exit for separated particles from the vertical cyclone tube into a bottom of the body of the tank such that solid particles contained within the incoming fluid stream separate by centrifugal force and fall downward within the cyclone tube and then exit the open bottom of the cyclone tube before settling to a bottom of the tank, an open top of the cyclone tube protruding into and communicating with a gas/air phase located at the top of the tank above a liquids phase, a pressure-vacuum vent valve provided in the top of the tank such that entrained gases and air separate from the fluid stream within the vertical cyclone tube and flow upward to exit the open top of the cyclone tube and enter the gas/air phase of the tank before exiting the tank through the pressure-vacuum vent valve, a horizontal cyclone liquids outlet tube provided in the vertical cyclone tube just above the at least one cyclone inlet, said cyclone liquids outlet tube communicating between the interior of the cyclone tube and the liquids phase within the body of the tank such that the fluid stream discharges from the cyclone tube via the cyclone liquids outlet tube horizontally and on tangent and impinges on an inside surface of the tank to effect further enhance solids separation from the liquid and to impart a rotating flow to the fluid stream as it enters the liquids phase within the body of the tank, and a plurality of vertical flow dividing tubes provided within the body of the tank, each of the vertical flow dividing tubes being open at an upper end and communicating with associated effluent piping designed to carry the individual divided flow streams to subsequent separate downstream vessels, the upper ends of all of the vertical flow dividing tube being at approximately the same elevation so that the fluid stream flows from the body of the tank into the open tops of the plurality of vertical flow dividing tubes and creates separate effluent streams that are approximately equal in volume that flow via the effluent piping to subsequent separate downstream vessels.

6. An atmospheric vertical oilfield tank according to claim 5 further comprising:

said vertical tank being taller than subsequent downstream vessels to which the effluent discharge piping connects such that flow from the vertical tank occurs without pumps.

* * * * *